United States Patent
Fan

(10) Patent No.: US 11,917,717 B2
(45) Date of Patent: Feb. 27, 2024

(54) WIRELESS NETWORK DETECTION APPARATUS AND METHOD FOR DETECTING NON-PREDETERMINED ELECTRONIC APPARATUS

(71) Applicant: Sigmastar Technology Ltd., Xia'men (CN)

(72) Inventor: Jin-Hua Fan, Shenzhen (CN)

(73) Assignee: SIGMASTAR TECHNOLOGY LTD., Xia'Men (CN)

( * ) Notice: Subject to any disclaimer, the term of this patent is extended or adjusted under 35 U.S.C. 154(b) by 322 days.

(21) Appl. No.: 17/351,287

(22) Filed: Jun. 18, 2021

(65) Prior Publication Data
US 2022/0007166 A1    Jan. 6, 2022

(30) Foreign Application Priority Data
Jul. 3, 2020 (CN) .......................... 202010631158.4

(51) Int. Cl.
*H04W 74/02* (2009.01)
*G06F 21/56* (2013.01)
(Continued)

(52) U.S. Cl.
CPC ........... *H04W 8/005* (2013.01); *H04W 76/14* (2018.02)

(58) Field of Classification Search
CPC ....... H04W 84/18; H04W 4/80; H04W 74/02; H04W 4/70; H04W 48/12; H04W 24/08; H04W 8/005; H04W 12/068; H04W 12/128; H04W 76/14; H04W 48/14; G06F 21/604; G06F 9/4881; G06F 9/4418;
(Continued)

(56) References Cited

U.S. PATENT DOCUMENTS 8,411,582 B2* 4/2013 Kataoka ................. H04L 67/14
370/252
2006/0234702 A1* 10/2006 Wiberg ................. H04W 48/14
455/435.2
(Continued)

*Primary Examiner* — Edan Orgad
*Assistant Examiner* — Vanneilian Lalchinthang
(74) *Attorney, Agent, or Firm* — WPAT, P.C

(57) ABSTRACT

The present invention discloses a wireless network detection apparatus. A storage circuit stores virtual wireless communication apparatus information. A wireless signal transmission circuit communicates using a wireless communication protocol. A processing circuit executes software or firmware executable commands to perform a wireless network detection method including the steps outlined below. Whether a wireless signal including non-predetermined electronic apparatus identification information being received is determined. When the wireless signal is received, an existence signal is broadcasted accordingly. A first-time pairing information that is transmitted from a non-predetermined electronic apparatus based on the existence signal is received to perform the first-time pairing and store the non-predetermined electronic apparatus identification information in the storage circuit. When an active communication signal or a passive response signal from the non-predetermined electronic apparatus is received, the non-predetermined electronic apparatus is identified and determined to be within a detection range. A predetermined function is executed.

12 Claims, 2 Drawing Sheets

(51) Int. Cl.
*H04Q 1/00* (2006.01)
*G06F 9/48* (2006.01)
*H04W 8/00* (2009.01)
*H04W 76/14* (2018.01)

(58) Field of Classification Search
CPC ... H04L 63/083; H04L 9/0637; H04L 9/0894; H04L 2209/80; Y02D 30/70
USPC .......................................................... 370/254
See application file for complete search history.

(56) References Cited

U.S. PATENT DOCUMENTS

| | | | | |
|---|---|---|---|---|
| 2011/0028093 | A1* | 2/2011 | Patel | H04B 17/27 |
| | | | | 455/41.2 |
| 2013/0204962 | A1* | 8/2013 | Estevez | H04N 7/185 |
| | | | | 709/217 |
| 2017/0245110 | A1* | 8/2017 | Ruiz | H04W 4/023 |
| 2017/0269965 | A1* | 9/2017 | Son | G06F 9/4831 |
| 2018/0121655 | A1* | 5/2018 | Abene | H04W 12/068 |
| 2018/0302923 | A1* | 10/2018 | Patil | H04W 74/008 |
| 2018/0324152 | A1* | 11/2018 | Jarchafjian | H04W 12/63 |
| 2019/0006891 | A1* | 1/2019 | Park | H04W 4/80 |
| 2019/0123798 | A1* | 4/2019 | Lou | H04B 7/0695 |
| 2020/0272827 | A1* | 8/2020 | Morrow | B64D 1/02 |

\* cited by examiner

WIRELESS NETWORK DETECTION APPARATUS AND METHOD FOR DETECTING NON-PREDETERMINED ELECTRONIC APPARATUS

CROSS-REFERENCE TO RELATED APPLICATION

This non-provisional application claims priority under 35 U.S.C. § 119(a) to Patent Application No. 202010631158.4 filed in China, P.R.C. on Jul. 3, 2020, the entire contents of which are hereby incorporated by reference.

BACKGROUND OF THE INVENTION

1. Field of the Invention

The present invention relates to a wireless network detection apparatus and a wireless network detection method for detecting a non-predetermined electronic apparatus.

2. Description of Related Art

Electronic devices that operate according to the environment of a user or whether the user is in a neighboring area are widely used in human's life. For example, wireless webcams used to monitor an environment can be configured to perform monitoring when the user leaves a predetermined environment and stop to perform monitoring when the user is back to the predetermined environment. Besides, smart home appliances or lighting fixtures can be turned on when the user enters the predetermined environment and be turned off when the user leaves the predetermined environment. The electronic devices described above need to detect whether the user is within the predetermined environment to operate correctly.

In some approaches, for an electronic device that performs a function based on an identification result of a subject, a face identification technology is often used to determine whether the subject is within the detection range. However, the face identification is limited by the factors such as a detection angle or environmental luminance. The face may not be efficiently identified such that the condition that the corresponding command is not executed while the subject is present may occur.

SUMMARY OF THE INVENTION

In consideration of the problem of the prior art, an object of the present invention is to provide a wireless network detection apparatus and a wireless network detection method for detecting a non-predetermined electronic apparatus to improve the prior art.

An object of the present invention is to provide a wireless network detection apparatus and method for detecting a non-predetermined electronic apparatus to perform active detection or passive detection by pairing with a non-predetermined electronic apparatus. The non-predetermined electronic apparatus is determined to be within a detection range when the non-predetermined electronic apparatus responses and then a corresponding predetermined function is executed.

The present invention discloses a wireless network detection apparatus for detecting a non-predetermined electronic apparatus. The wireless network detection apparatus includes a storage circuit, a wireless signal transmission circuit and a processing circuit. The storage circuit is configured to store virtual wireless communication apparatus information. The wireless signal transmission circuit is configured to perform communication according to at least one wireless communication protocol. The processing circuit is electrically coupled to the storage circuit and the wireless signal transmission circuit and configured to execute a plurality of software or firmware executable commands to perform a wireless network detection method. The wireless network detection method includes the steps outlined below. Whether a wireless signal including non-predetermined electronic apparatus identification information being received is determined. The wireless signal transmission circuit is controlled to broadcast an existence signal according to the virtual wireless communication apparatus information when the wireless signal is received. The wireless signal transmission circuit is controlled to receive first-time pairing information that is transmitted from the non-predetermined electronic apparatus based on the existence signal, to confirm that a first-time pairing is finished performing with the non-predetermined electronic apparatus and to store the non-predetermined electronic apparatus identification information in the storage circuit. Whether the wireless signal transmission circuit receives a response signal or a communication signal from the non-predetermined electronic apparatus is determined, wherein the response signal is generated by the non-predetermined electronic apparatus in response to a connection request or a management packet actively transmitted by the wireless signal transmission circuit, and the communication signal is actively generated by the non-predetermined electronic apparatus. The non-predetermined electronic apparatus is identified and the non-predetermined electronic apparatus being within a detection range is determined when the response signal or the communication signal is received. A predetermined function that is not related to a virtual wireless communication apparatus corresponding to the virtual wireless communication apparatus information is executed.

The present invention also discloses a wireless network detection method for detecting a non-predetermined electronic apparatus used in a wireless network detection apparatus that includes the steps outlined below. By a processing circuit, whether a wireless signal comprising non-predetermined electronic apparatus identification information is received by a wireless signal transmission circuit is determined. The wireless signal transmission circuit is controlled, by the processing circuit when the wireless signal is received, to broadcast an existence signal according to virtual wireless communication apparatus information stored in a storage circuit. The wireless signal transmission circuit is controlled to receive first-time pairing information that is transmitted from the non-predetermined electronic apparatus based on the existence signal, to confirm that a first-time pairing is finished performing with the non-predetermined electronic apparatus and to store the non-predetermined electronic apparatus identification information in the storage circuit by the processing circuit. Whether the wireless signal transmission circuit receives a response signal or a communication signal from the non-predetermined electronic apparatus is determined by the processing circuit, wherein the response signal is generated by the non-predetermined electronic apparatus in response to a connection request or a management packet actively transmitted by the wireless signal transmission circuit, and the communication signal is actively generated by the non-predetermined electronic apparatus. The non-predetermined electronic apparatus is identified and the non-predetermined electronic apparatus being within a detection range is determined by the processing circuit when the response signal or the communication signal is received. A predetermined function that is not related to a virtual wireless communication apparatus corresponding to the virtual wireless communication apparatus information is executed by the processing circuit.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a wireless network detection apparatus and a wireless network detection method for detecting a non-predetermined electronic apparatus to perform pairing with a non-predetermined electronic apparatus so as to perform active detection or passive detection. The non-predetermined electronic apparatus is determined to be within a detection range when the non-predetermined electronic apparatus responses such that a corresponding predetermined function is executed.

Figure 1:
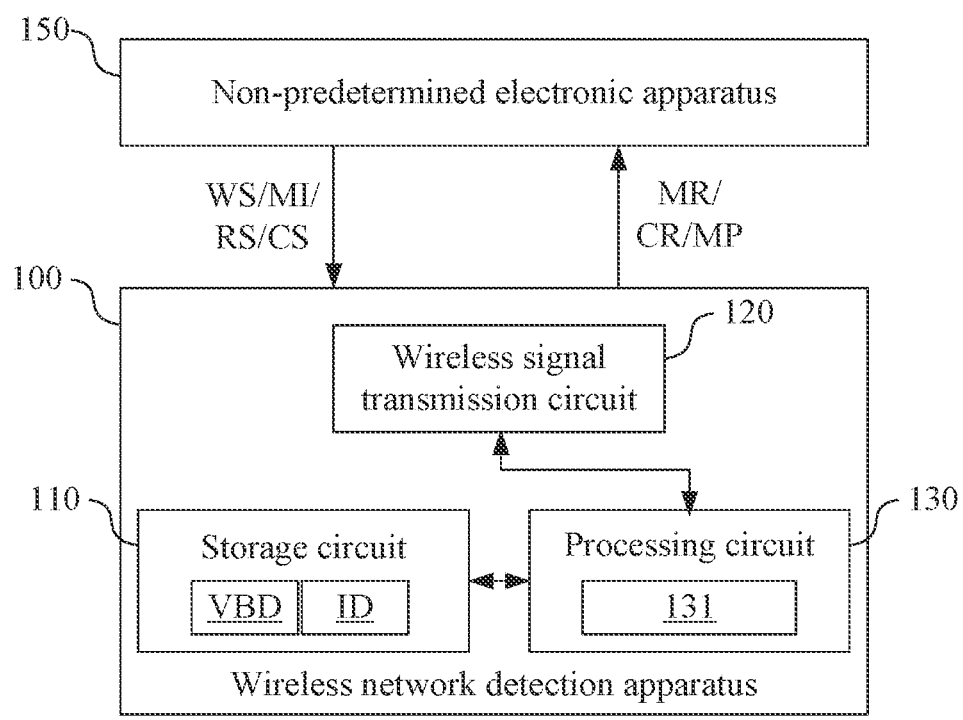
FIG. 1 illustrates a block diagram of a wireless network detection apparatus and a non-predetermined electronic apparatus according to an embodiment of the present invention.

Reference is now made to FIG. 1. FIG. 1 illustrates a block diagram of a wireless network detection apparatus 100 and a non-predetermined electronic apparatus 150 according to an embodiment of the present invention. The wireless network detection apparatus 100 is used to detect the existence of the non-predetermined electronic apparatus 150 and includes a storage circuit 110, a wireless signal transmission circuit 120 and a processing circuit 130.

The storage circuit 110 can be implemented by such as, but not limited to an optical disc, a random access memory (RAM), a read only memory (ROM), a floppy disk, a hard disk or an optical disk. Further, the storage circuit 110 is configured to store virtual wireless communication apparatus information VBD.

In an embodiment, the virtual wireless communication apparatus information VBD is Bluetooth low energy (BLE) apparatus information corresponding to a human interface device (HID) or a Bluetooth headset. The human interface device can be such as, but not limited to a mouse, a joy stick or a keyboard. In another embodiment, the virtual wireless communication apparatus information VBD is WiFi router information corresponding to a WiFi router.

More specifically, the wireless network detection apparatus 100 itself is not any device described above. However, the wireless network detection apparatus 100 stores the virtual wireless communication apparatus information VBD that can be identified as one of the devices described above.

The wireless signal transmission circuit 120 is configured to perform communication according to at least one wireless communication protocol. In an embodiment, the wireless communication protocol is Bluetooth and/or WiFi communication protocol. As a result, the wireless signal transmission circuit 120 can be configured to perform wireless network communication based on Bluetooth or WiFi technology.

The processing circuit 130 is electrically coupled to the storage circuit 110 and the wireless signal transmission circuit 120. The processing circuit 130 may include one or more than one microprocessors to execute software or firmware executable commands 131 to perform the function of the wireless network detection apparatus 100.

More specifically, the processing circuit 130 can retrieve the software or firmware executable commands 131 from a storage module (not illustrated) in the wireless network detection apparatus 100, in which the software or firmware executable commands 131 include such as, but not limited to the firmware/driver of the storage circuit 110 and the wireless signal transmission circuit 120 or other commands for operating and controlling the storage circuit 110 and the wireless signal transmission circuit 120. The storage circuit 110 and the wireless signal transmission circuit 120 thus can be operated and controlled to accomplish the function of detecting the non-predetermined electronic apparatus 150. The term "non-predetermined" refers to any electronic apparatus that can perform communication based on the wireless communication protocol with the wireless network detection apparatus 100.

It is appreciated that the storage module described above can be implemented either by the storage circuit 110 or by another module circuit independent from the storage circuit 110. The present invention is not limited thereto.

Figure 2:
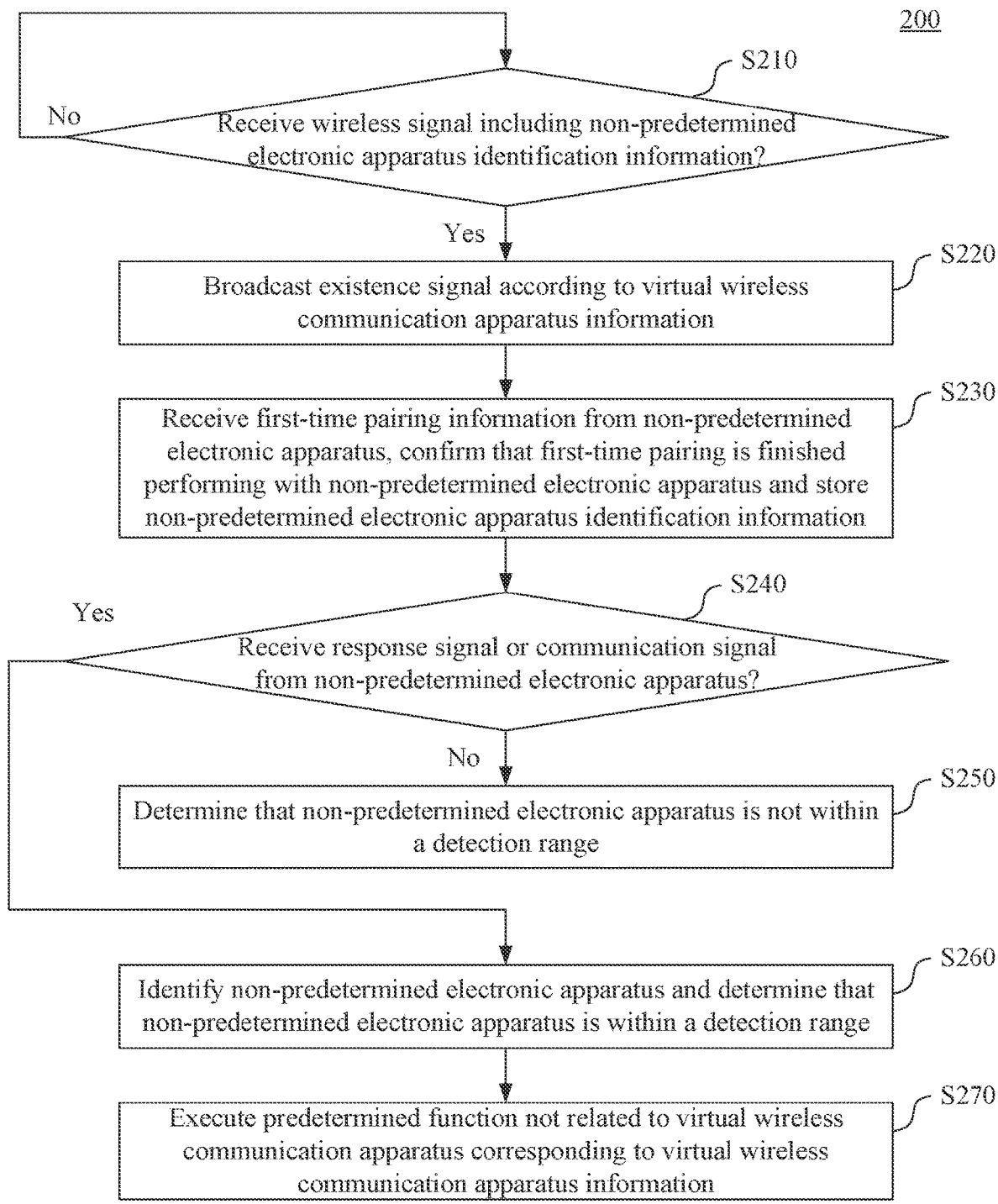
FIG. 2 illustrates a flow chart of a wireless network detection method according to an embodiment of the present invention.

Reference is now made to FIG. 2. The detail function of the wireless network detection apparatus 100 is further described in accompany with FIG. 1 and FIG. 2.

FIG. 2 illustrates a flow chart of a wireless network detection method 200 according to an embodiment of the present invention. The wireless network detection method 200 can be used in the wireless network detection apparatus 100 illustrated in FIG. 1. The wireless network detection method 200, as illustrated in FIG. 2, includes the steps outlined below.

In step 210, whether a wireless signal WS including non-predetermined electronic apparatus identification information ID being received by the wireless signal transmission circuit 120 is determined by the processing circuit 130. When such a wireless signal WS is not received by the wireless signal transmission circuit 120, the flow goes back to step S210 to keep performing determination.

In an embodiment, the processing circuit 130 stores the non-predetermined electronic apparatus identification information ID in the storage module, such as but not limited to the storage circuit 110. In an embodiment, the non-predetermined electronic apparatus identification information ID can be such as, but not limited to a media access control (MAC) address of the non-predetermined electronic apparatus 150 and is stored in an identification information white list.

In step S220, the wireless signal transmission circuit 120 is controlled to broadcast an existence signal MR according to the virtual wireless communication apparatus information VBD stored in the storage circuit 110 by the processing circuit 130 when the wireless signal WS is received.

In an embodiment, the wireless network detection apparatus 100 is an apparatus disposed at a fixed position. The non-predetermined electronic apparatus 150 can be such as, but not limited to a smartphone or other portable apparatus. By broadcasting the existence signal MR described above, the wireless network detection apparatus 100 can announce the existence of itself to neighboring electronic apparatus. In an embodiment, when the non-predetermined electronic apparatus 150 is a smartphone, no application program is required to be installed therein. Further, the non-predetermined electronic apparatus 150 does not need to operate under an unlock status. Only the wireless communication function is required to be turned on.

In step S230, the wireless signal transmission circuit 120 is controlled to receive first-time pairing information MI that is transmitted from the non-predetermined electronic apparatus 150 based on the existence signal MR, to confirm that a first-time pairing is finished performing with the non-predetermined electronic apparatus 150 and to store the non-predetermined electronic apparatus identification information ID in the storage circuit 110 by the processing circuit 130.

In an embodiment, after the wireless network detection apparatus 100 broadcasts the existence signal MR, the non-predetermined electronic apparatus 150 receives the existence signal MR and retrieves the data related to the virtual wireless communication apparatus information VBD to perform pairing. Further, the non-predetermined electronic apparatus 150 transmits back the first-time pairing information MI when the pairing is successfully performed. The processing circuit 130 receives the first-time pairing information MI through the wireless signal transmission circuit 120 to confirm that the first-time pairing is finished performing with the non-predetermined electronic apparatus 150. In an embodiment, the first-time pairing information MI includes non-predetermined electronic apparatus identification information ID. The processing circuit 130 stores the non-predetermined electronic apparatus identification information ID in a list, wherein the list stores the apparatus that is successfully paired with the wireless network detection apparatus 100.

In step S240, whether the wireless signal transmission circuit 120 receives a response signal RS or a communication signal CS from the non-predetermined electronic apparatus 150 is determined by the processing circuit 130, wherein the response signal RS is generated by the non-predetermined electronic apparatus 150 in response to a connection request CR or a management packet MP actively transmitted by the wireless signal transmission circuit 120, and the communication signal CS is actively transmitted by the non-predetermined electronic apparatus 150.

In an embodiment, the non-predetermined electronic apparatus 150 can actively transmit the communication signal CS according to Bluetooth technology or WiFi technology so as to be received by the wireless signal transmission circuit 120. It is appreciated that the target of the communication signal CS actively transmitted by the non-predetermined electronic apparatus 150 is not necessarily the wireless network detection apparatus 100. More specifically, besides the wireless network detection apparatus 100, the target of the communication signal CS actively transmitted by the non-predetermined electronic apparatus 150 can be any other electronic devices.

In another embodiment, when the Bluetooth technology is used to perform communication, the processing circuit 130 can transmit the connection request CR under a predetermined time period through the wireless signal transmission circuit 120. When the WiFi technology is used to perform communication, the processing circuit 130 can transmit the management packet MP through the wireless signal transmission circuit 120. When the non-predetermined electronic apparatus 150 receives the connection request CR or the management packet MP, the non-predetermined electronic apparatus 150 can generate the response signal RS in response such that the response signal RS is received by the wireless signal transmission circuit 120. As a result, when the non-predetermined electronic apparatus 150 does not perform communication actively, the wireless network detection apparatus 100 can stimulate the non-predetermined electronic apparatus 150 to perform communication by transmitting the connection request CR or the management packet MP. The detection mechanism can be accomplished.

In step S250, the non-predetermined electronic apparatus 150 is determined to be not within a detection range by the processing circuit 130 when either the response signal RS or the communication signal CS is not received.

In step S260, the non-predetermined electronic apparatus 150 is identified and the non-predetermined electronic apparatus 150 being within a detection range is determined by the processing circuit 130 when the response signal RS or the communication signal CS is received.

In an embodiment, the processing circuit 130 can identify the non-predetermined electronic apparatus 150 according to the non-predetermined electronic apparatus identification information ID, such as but not limited to the media access control (MAC) address, in the response signal RS or the communication signal CS. The processing circuit 130 can thus confirm that the non-predetermined electronic apparatus 150 is a device already paired with the wireless network detection apparatus 100 before.

Since the non-predetermined electronic apparatus 150 is a portable device, the non-predetermined electronic apparatus 150 may not be within the detection range due to the movement of the user. The processing circuit 130 can keep transmitting the connection request CR or the management packet MP through the wireless signal transmission circuit 120 to perform active detection, or receive the communication signal CS to perform passive detection.

When the processing circuit 130 does not receive the response signal RS or the communication signal CS through the wireless signal transmission circuit 120, the non-predetermined electronic apparatus 150 is determined to be not within the detection range. On the contrary, when the processing circuit 130 receives the response signal RS or the communication signal CS through the wireless signal transmission circuit 120, the non-predetermined electronic apparatus 150 is determined to be within the detection range.

In step S270, a predetermined function that is not related to the virtual wireless communication apparatus corresponding to the virtual wireless communication apparatus information VBD is executed by the processing circuit 130.

More specifically, the virtual wireless communication apparatus information VBD virtually corresponds to the human interface device, the Bluetooth headset or the WiFi router described above. Since the wireless network detection apparatus 100 is actually not any one of these devices, the predetermined function executed by the processing circuit 130 is not related to the human interface device, the Bluetooth headset or the WiFi router.

In an embodiment, the predetermined function includes a determination of a condition that the non-predetermined electronic apparatus 150 is in a white list of an application program and an execution of the application program subsequently.

For example, the wireless network detection apparatus 100 can be disposed in such as, but not limited to a webcam (not illustrated). By determining that the non-predetermined electronic apparatus 150 is within the detection range and is in the white list, the processing circuit 130 can control the related application program to turn the direction of the webcam or stop the webcam from video shooting. The user of the non-predetermined electronic apparatus 150 is thus not filmed by the webcam. The privacy of the user can be protected.

In another embodiment, the predetermined function includes a control of turn-on or turn-off of a smart device (not illustrated).

For example, the wireless network detection apparatus 100 can be disposed in such as, but not limited to a smart home appliance, an Internet of Things (IoT) lighting fixtures or a control device of a garage door (not illustrated). The processing circuit 130 can control the devices described above automatically turn on or turn off by confirming that the non-predetermined electronic apparatus 150 is within the detection range.

In some approaches, for an electronic device that performs a function based on an identification result of a subject, a face identification technology is often used to determine whether the subject is within the detection range such that the corresponding command is executed when the face of the subject is successfully identified. However, the face identification is limited by the factors such as a detection angle or environmental luminance. The face may not be efficiently identified such that the condition that the corresponding command is not executed while the subject is present may occur.

The wireless network detection apparatus 100 of the present invention can pretend to be a wireless communication device, e.g. a Bluetooth device or a WiFi device, and paired with the non-predetermined electronic apparatus 150 held by the subject. An active detection or a passive detection can be performed such that the non-predetermined electronic apparatus 150 is determined to be within a detection range when the non-predetermined electronic apparatus 150 responses to further execute a corresponding predetermined function.

It is appreciated that the embodiments described above are merely an example. In other embodiments, it should be appreciated that many modifications and changes may be made by those of ordinary skill in the art without departing, from the spirit of the invention.

In summary, the wireless network detection apparatus and the wireless network detection method for detecting a non-predetermined electronic apparatus can perform pairing with the non-predetermined electronic apparatus so as to perform active detection or passive detection. The non-predetermined electronic apparatus is determined to be within a detection range when the non-predetermined electronic apparatus responses such that a corresponding predetermined function is executed.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A wireless network detection apparatus for detecting a non-predetermined electronic apparatus, comprising:
    a storage circuit configured to store virtual wireless communication apparatus information, wherein the virtual wireless communication apparatus information let the wireless network detection apparatus be identified as a virtual wireless communication apparatus, and the virtual wireless communication apparatus is not the wireless network detection apparatus;
    a wireless signal transmission circuit configured to perform communication according to at least one wireless communication protocol; and
    a processing circuit electrically coupled to the storage circuit and the wireless signal transmission circuit and configured to execute a plurality of software or firmware executable commands to perform a wireless network detection method, the wireless network detection method comprising:
        determining whether a wireless signal comprising non-predetermined electronic apparatus identification information is received by the wireless signal transmission circuit;
        controlling the wireless signal transmission circuit to broadcast an existence signal announcing the existence of the wireless network detection apparatus according to the virtual wireless communication apparatus information when the wireless signal is received;
        controlling the wireless signal transmission circuit to receive first-time pairing information that is transmitted from the non-predetermined electronic apparatus based on the existence signal, to confirm that the first-time pairing is finished performing with the non-predetermined electronic apparatus and to store the non-predetermined electronic apparatus identification information in the storage circuit;
        determining whether the wireless signal transmission circuit receives a response signal or a communication signal from the non-predetermined electronic apparatus,
        wherein the response signal is generated by the non-predetermined electronic apparatus in response to a connection request or a management packet actively transmitted by the wireless signal transmission circuit, and the communication signal is actively generated by the non-predetermined electronic apparatus;
        identifying the non-predetermined electronic apparatus and determining that the non-predetermined electronic apparatus is within a detection range when the response signal or the communication signal is received; and
        executing a predetermined function that is not related to the virtual wireless communication apparatus corresponding to the virtual wireless communication apparatus information.

2. The wireless network detection apparatus of claim 1, wherein the wireless communication protocol is Bluetooth and/or WiFi communication protocol, the non-predetermined electronic apparatus is a Bluetooth apparatus or a WiFi apparatus, and the virtual wireless communication apparatus information is Bluetooth low energy (BLE) apparatus information corresponding to a human interface device (HID) or a Bluetooth headset or WiFi router information corresponding to a WiFi router.

3. The wireless network detection apparatus of claim 1, wherein the non-predetermined electronic apparatus identification information is a media access control (MAC) address of the non-predetermined electronic apparatus.

4. The wireless network detection apparatus of claim 1, wherein the predetermined function comprises a determination of the non-predetermined electronic apparatus being in a white list of an application program and an execution of the application program subsequently.

5. The wireless network detection apparatus of claim 1, wherein the predetermined function comprises a control of turn-on or turn-off of a smart device.

6. The wireless network detection apparatus of claim 1, wherein the non-predetermined electronic apparatus is a smartphone and the smartphone is not necessary to have any application program installed.

7. A wireless network detection method for detecting a non-predetermined electronic apparatus used in a wireless network detection apparatus, comprising:
- determining, by a processing circuit, whether a wireless signal comprising non-predetermined electronic apparatus identification information is received by a wireless signal transmission circuit;
- controlling the wireless signal transmission circuit, by the processing circuit when the wireless signal is received, to broadcast an existence signal announcing the existence of the wireless network detection apparatus according to virtual wireless communication apparatus information stored in a storage circuit, wherein the virtual wireless communication apparatus information let the wireless network detection apparatus be identified as a virtual wireless communication apparatus, and the virtual wireless communication apparatus is not the wireless network detection apparatus;
- controlling the wireless signal transmission circuit to receive first-time pairing information that is transmitted from the non-predetermined electronic apparatus based on the existence signal, to confirm that the first-time pairing is finished performing with the non-predetermined electronic apparatus and to store the non-predetermined electronic apparatus identification information in the storage circuit by the processing circuit;
- determining whether the wireless signal transmission circuit receives a response signal or a communication signal from the non-predetermined electronic apparatus by the processing circuit, wherein the response signal is generated by the non-predetermined electronic apparatus in response to a connection request or a management packet actively transmitted by the wireless signal transmission circuit, and the communication signal is actively transmitted by the non-predetermined electronic apparatus;
- identifying the non-predetermined electronic apparatus and determining that the non-predetermined electronic apparatus is within a detection range by the processing circuit when the response signal or the communication signal is received; and
- executing a predetermined function that is not related to the virtual wireless communication apparatus corresponding to the virtual wireless communication apparatus information by the processing circuit.

8. The wireless network detection method of claim 7, wherein the wireless communication protocol is Bluetooth and/or WiFi communication protocol, the non-predetermined electronic apparatus is a Bluetooth apparatus or a WiFi apparatus, and the virtual wireless communication apparatus information is Bluetooth low energy (BLE) apparatus information corresponding to a human interface device (HID) or a Bluetooth headset or WiFi router information corresponding to a WiFi router.

9. The wireless network detection method of claim 7, wherein the non-predetermined electronic apparatus identification information is a media access control (MAC) address of the non-predetermined electronic apparatus.

10. The wireless network detection method of claim 7, wherein the predetermined function comprises a determination of the non-predetermined electronic apparatus being in a white list of an application program and an execution of the application program subsequently.

11. The wireless network detection method of claim 7, wherein the predetermined function comprises a control of turn-on or turn-off of a smart device.

12. The wireless network detection method of claim 7, wherein the non-predetermined electronic apparatus is a smartphone and the smartphone is not necessary to have any application program installed.

* * * * *